US012618231B2

(12) United States Patent
Li et al.

(10) Patent No.: US 12,618,231 B2
(45) Date of Patent: May 5, 2026

(54) SELF-ADAPTIVE MULTI-MODE DEVICE FOR HIGH-EFFICIENCY AND ALL-WEATHER WATER HARVESTING FROM AIR

(71) Applicant: SHANGHAI JIAO TONG UNIVERSITY, Shanghai (CN)

(72) Inventors: Tingxian Li, Shanghai (CN); Pengfei Wang, Shanghai (CN); Jiaxing Xu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 79 days.

(21) Appl. No.: 18/763,462

(22) Filed: Jul. 3, 2024

(65) Prior Publication Data

US 2025/0243648 A1     Jul. 31, 2025

(30) Foreign Application Priority Data

Jan. 30, 2024   (CN) .......................... 202410132288.1

(51) Int. Cl.
*E03B 3/28* (2006.01)
*B01D 53/26* (2006.01)

(52) U.S. Cl.
CPC ............... *E03B 3/28* (2013.01); *B01D 53/26* (2013.01); *Y02A 20/00* (2018.01)

(58) Field of Classification Search
CPC .... B01D 5/0039; B01D 53/26; B01D 53/261;

B01D 53/265; B01D 53/0462; F24F 3/1405; F24F 3/1411; F24F 3/1429; F24F 2003/1452; E03B 3/28
See application file for complete search history.

(56) References Cited

U.S. PATENT DOCUMENTS

| | | | | |
|---|---|---|---|---|
| 4,430,864 A | * | 2/1984 | Mathiprakasam | ...... F25B 13/00 62/324.1 |
| 4,761,968 A | * | 8/1988 | Basseen | ................... F16L 55/09 96/144 |
| 4,793,143 A | * | 12/1988 | Rhodes | ................. F24F 3/1429 62/93 |
| 4,984,434 A | * | 1/1991 | Peterson | ............... F24F 5/0014 62/271 |
| 5,335,719 A | * | 8/1994 | Khelifa | ................. F24F 3/1423 62/271 |

(Continued)

*Primary Examiner* — Christopher R Zerphey

(74) *Attorney, Agent, or Firm* — Birchwood IP

(57) ABSTRACT

Provided is a self-adaptive multi-mode device for high-efficiency and all-weather water harvesting from air. Electromagnetic three-way valves and a four-way reversing valve are controlled by a PLC module integrated with energy efficiency algorithms, thus realizing a device for water harvesting from air capable of self-adaptively switching working modes according to the working environment. By controlling the four-way reversing valve, heat energy and cold energy released by the condenser and the evaporator during the heat pump cycle can be fully utilized, and sorbent coatings at the cooling side are always kept in a sorption state, and sorbent coatings at the heat release side are always kept in a desorption state, so that continuous and high-efficiency water supply is realized, presenting higher energy conversion and utilization efficiency than the conventional electrical heating or electrical refrigeration technology.

6 Claims, 5 Drawing Sheets

(56)          References Cited

U.S. PATENT DOCUMENTS

| | | | |
|---|---|---|---|
| 6,746,515 B2 * | 6/2004 | Wegeng ............. | H01M 8/0662 |
| | | | 95/115 |
| 7,014,683 B2 * | 3/2006 | Vierling ............... | F26B 21/083 |
| | | | 96/144 |
| 9,829,238 B2 * | 11/2017 | Unezaki ............... | F24F 3/1405 |

* cited by examiner

SELF-ADAPTIVE MULTI-MODE DEVICE FOR HIGH-EFFICIENCY AND ALL-WEATHER WATER HARVESTING FROM AIR

CROSS-REFERENCE TO RELATED APPLICATION

This patent application claims the benefit and priority of Chinese Patent Application No. 202410132288.1 filed with the China National Intellectual Property Administration on Jan. 30, 2024, the disclosure of which is incorporated by reference herein in its entirety as part of the present application.

TECHNICAL FIELD

The present disclosure relates to the technical field of water harvesting from air, in particular to a self-adaptive multi-mode device for all-weather water harvesting from air.

BACKGROUND

The technology for water harvesting from air is mainly performed in the following manner: fog-collection-based atmospheric water harvesting, direct-dew-based atmospheric water harvesting, and sorption-based atmospheric water harvesting. The fog-collection-based atmospheric water harvesting technology is only suitable for extremely high relative humidity environments, and thus is greatly limited by region and time. The direct-dew-based atmospheric water harvesting technology obtains condensed water by directly cooling the air below the dew point temperature. This technology is mature with a simple working principle and is more suitable for working in high relative humidity environments. However, it is difficult to operate in low relative humidity environments, typically presenting high energy consumption and even facing the risks of machine frosting and no water production. The sorption-based atmospheric water harvesting technology can harvest water from air in a wide relative humidity environment by means of water sorbent. However, current research shows that the sorption-based atmospheric water harvesting technology has low efficiency at high relative humidity environments, and the energy consumption thereof is significantly higher than that of direct-dew-based atmospheric water harvesting technology, so the sorption-based atmospheric water harvesting technology is more suitable for operation in low relative humidity environments.

After retrieval of the prior art, it is found that the existing device for water harvesting from air generally adopts a single direct-dew-based atmospheric water harvesting or sorption-based atmospheric water harvesting technology. For instance, the Chinese Patent Application NO. CN202321057677.X designs a novel structure on the device using direct-dew-based atmospheric water harvesting technology, realizing higher stability and improved condensation efficiency However, the device present high energy consumption and low water production efficiency when operate in low-temperature and low-humidity environments. Even worse, due to the low dew point temperature, this device has the disadvantages of no water production and machine frosting, thus heavily limit their environment applicability. The existing Chinese Patent Application NO CN201710711661.9 designs a using method of a device for water harvesting from air combined with a multi-stage rotating wheel and a refrigeration device. By means of a single sorption-based atmospheric water harvesting technology, the device has wide environmental applicability, but the device has low water production efficiency and low energy efficiency when work in the environments with relative high humidity.

However, in real life, the annual and daily relative humidity fluctuate greatly, thus it is difficult to meet the requirement of energy-saving and high-efficiency water production in all-weather wide working conditions only by means of a single atmospheric water harvesting technology.

SUMMARY

The present disclosure aims to provide a self-adaptive multi-mode device for all-weather water harvesting from air so as to solve the problem of how to meet energy-saving and high-efficiency water production in all-weather-wide working conditions without the restriction of region and time.

In order to solve the technical problem, the present disclosure adopts the following technical scheme.

The present disclosure provides a self-adaptive multi-mode device for all-weather water harvesting from air including two sorbent-coating heat exchangers, a plurality of fins respectively arranged inside the two sorbent-coating heat exchangers, a refrigerant closed-loop pipeline for communicating the fins inside the two sorbent-coating heat exchangers in series, three-way valves respectively arranged at air inlet ends of the two sorbent-coating heat exchangers, fans for providing power to drive air inside the two sorbent-coating heat exchangers, three-way valves respectively arranged at air outlet ends of the two sorbent-coating heat exchangers, water collectors configured for receiving water, and a sorption water collection module communicated with the two sorbent-coating heat exchangers via pipelines; in which sorbent coatings are respectively arranged on the fins; a four-way reversing valve, a compressor and an expansion valve are arranged on the refrigerant closed-loop pipeline, and are integrated with the two sorbent-coating heat exchangers to form a heat pump cycle and drive refrigerant to flow inside the refrigerant closed-loop pipeline; and the sorption water collection module comprises an air heat exchanger communicated with the three-way valves respectively arranged at the air outlet ends of the two sorbent-coating heat exchangers, two further three-way valves respectively communicated with the three-way valves respectively arranged at the air inlet ends of the two sorbent-coating heat exchangers, and a third water collector configured for collecting water produced by the two sorbent-coating heat exchangers.

In the embodiment, specifically, the two sorbent-coating heat exchangers comprise a first sorbent-coating heat exchanger and a second sorbent-coating heat exchanger, In which a plurality of first fins are arranged inside the first sorbent-coating heat exchanger, a first inlet air duct is arranged at an air inlet end of the first sorbent-coating heat exchanger, a first outlet air duct is arranged at an air outlet end of the first sorbent-coating heat exchanger, and a first fan is arranged at a bottom of the first sorbent-coating heat exchanger or inside the first sorbent-coating heat exchanger; a first three-way valve is installed on a pipeline of the first inlet air duct, and a second three-way valve is arranged on a pipeline of the first outlet air duct; a plurality of second fins are arranged inside the second sorbent-coating heat exchanger, a second inlet air duct is arranged at an air inlet end of the second sorbent-coating heat exchanger, a second outlet air duct is arranged at an air outlet end of the second sorbent-coating heat exchanger, and a second fan is arranged at a bottom of the second sorbent-coating heat exchanger or inside the second sorbent-coating heat exchanger; a third three-way valve is installed on a pipeline of the second inlet air duct, and a fourth three-way valve is arranged on a pipeline of the second outlet air duct.

In the embodiment, specifically, a first air filter is installed between the first inlet air duct and the first three-way valve; and a second air filter is installed between the second inlet air duct and the third three-way valve.

In the embodiment, specifically, one end of the second three-way valve connected to the first outlet air duct is connected to a first water collector, and another end of the second three-way valve connected to the first outlet air duct is connected to the air heat exchanger; one end of the first three-way valve connected to the first inlet air duct is communicated with environmental air, and another end of the first three-way valve connected to the first inlet air duct is connected to one end of a fifth three-way valve via a pipeline; and another end of the fifth three-way valve is communicated with external environment;

one end of the fourth three-way valve connected to the second outlet air duct is connected to a second water collector, and another end of the fourth three-way valve connected to the second outlet air duct is connected to the air heat exchanger; one end of the third three-way valve connected to the second inlet air duct is communicated with environmental air, and another end of the third three-way valve connected to the second inlet air duct is connected to one end of a sixth three-way valve via a pipeline; and another end of the sixth three-way valve is communicated with external environment.

In the embodiment, specifically, the first three-way valve, the second three-way valve, the third three-way valve, the fourth three-way valve, the fifth three-way valve and the sixth three-way valve are all electromagnetic valves; the four-way reversing valve is an electromagnetic reversing valve; the first three-way valve, the second three-way valve, the third three-way valve, the fourth three-way valve, the fifth three-way valve, the sixth three-way valve, the four-way reversing valve, the first fan, the second fan, and the compressor are all intelligently controlled by a PLC module integrated with energy efficiency algorithms to adaptively switch "direct-dew-based atmospheric water harvesting working mode" and "sorption-based atmospheric water harvesting working mode" according to temperature and humidity of working environment to realize continuous high-efficiency and energy-saving water production.

In the embodiment, specifically, when the temperature and humidity of the working environment are in high-efficiency ranges of "direct-dew-based atmospheric water harvesting working mode", path conditions of all three-way valves are adjusted to adopt the "direct-dew-based atmospheric water harvesting working mode" to obtain safe drinking water; when the temperature and humidity of the working environment are in high-efficiency ranges of "sorption-based atmospheric water harvesting working mode" or ranges where only the "sorption-based atmospheric water harvesting working mode" is capable of operating, the path conditions of all three-way valves are adjusted to adopt the "sorption-based atmospheric water harvesting working mode" to obtain safe drinking water; when the device adopts the "sorption-based atmospheric water harvesting working mode" to obtain safe drinking water, the four-way reversing valve is controlled according to sorption-desorption states of first sorbent coatings and second sorbent coatings respectively arranged inside the two sorbent-coating heat exchangers, making sure heat energy and cold energy respectively released by a condenser and an evaporator during operation of the heat pump cycle are fully utilized, so as to keep the sorbent coatings on a cooling side in a sorption state and the sorbent coatings on a heat release side in a desorption state to realize continuous water supply.

Compared with the prior art, the present disclosure has the following beneficial effects.

Firstly, through the integration of heat pump cycle and air cycle, the coupling of "direct-dew-based atmospheric water harvesting" and "sorption-based atmospheric water harvesting" technologies is realized. Compared with the conventional device using a single technology for water harvesting from air, this device is higher in environmental adaptability, higher in energy efficiency and water production efficiency, and can realize high-efficiency and energy-saving water harvesting from air in wide relative humidity environments.

Secondly, electromagnetic three-way valves and a four-way reversing valve are controlled by a PLC module integrated with energy efficiency algorithms, the working modes of water harvesting from air of the device are self-adaptively switched and adjusted according to the working environment. By controlling the four-way reversing valve, the sorbent coatings at the cooling side can always keep in a sorption state, and the sorbent coatings at the heat release side can always keep in a desorption state, so that to realize continuous water supply.

Thirdly, the heat energy and cold energy released by the condenser and the evaporator during the operation of the heat pump driven refrigerant loop are fully utilized to harvest water from air, thus achieving higher energy conversion and utilization efficiency than the conventional electrically-driven heating or electrically-driven refrigeration technology.

BRIEF DESCRIPTION OF THE DRAWINGS

The present disclosure is further described below in combination with the accompanying drawings.

Figure 1:
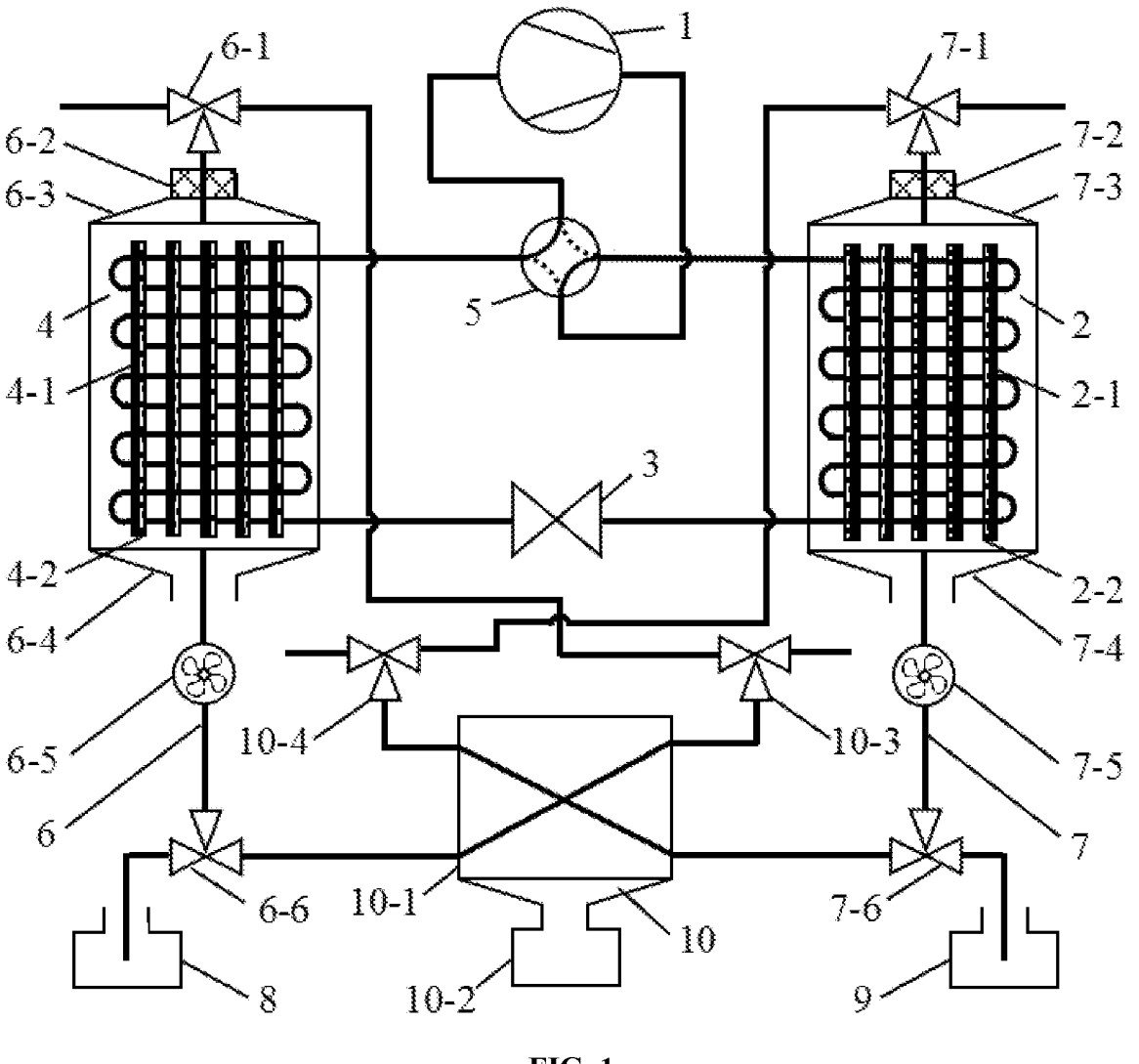
FIG. 1 is an integral structural schematic diagram of a self-adaptive multi-mode device for all-weather water harvesting from air in the present disclosure.

Reference numerals in attached figures: 1 compressor; 2 second sorbent-coating heat exchanger; 2-1 second fin; 2-2 second sorbent coating; 3 expansion valve; 4 first sorbent-coating heat exchanger; 4-1 first fin; 4-2 first sorbent coating; 5 four-way reversing valve; 6 first flow path; 6-1 first three-way valve; 6-2 first air filter; 6-3 first inlet air duct; 6-4 first outlet air duct; 6-5 first fan; 6-6 second three-way valve; 7 second flow path; 7-1 third three-way valve; 7-2 second air filter; 7-3 second inlet air duct; 7-4 second outlet air duct; 7-5 second fan; 7-6 fourth three-way valve; 8 first water collector; 9 second water collector; 10 sorption water collection module; 10-1 air heat exchanger; 10-2 third water collector; 10-3 fifth three-way valve; and 10-4 sixth three-way valve.

DETAILED DESCRIPTION OF THE EMBODIMENTS

A self-adaptive multi-mode device for all-weather water harvesting from air is provided in the embodiment. The device for water harvesting from air includes a heat pump driven refrigerant closed loop and a fan driven air loop. Electric energy can be efficiently converted into heat energy and cold energy to be released by means of the condenser and the evaporator during the operation of the heat pump driven refrigerant closed loop. The fan driven air loop is directly integrated on the heat pump driven refrigerant closed loop, and water in air is collected with the driving of heat energy and cold energy released by the condenser and the evaporator. The device for water harvesting from air can intelligently switch and choose the "direct-dew-based atmospheric water harvesting working mode" or "sorption-based atmospheric water harvesting working mode" with optimal energy efficiency according to the working environment by means of a PLC module integrated with energy efficiency algorithms. During the operation of "sorption-based atmospheric water harvesting working mode", by self-switching a flow path of the heat pump driven refrigerant closed loop, the sorbent coatings at the cooling side can be always kept in a sorption state, and the sorbent coatings at the heat release side can be always kept in a desorption state, so that continuous water supply is realized.

Specifically, the heat pump driven refrigerant closed loop includes a compressor 1, a second sorbent-coating heat exchanger 2, an expansion valve 3, a first sorbent-coating heat exchanger 4 and a four-way reversing valve 5. A first flow channel opening of the four-way reversing valve 5 is connected to an inlet of the compressor 1, an outlet of the compressor I is connected to a second flow channel opening of the four-way reversing valve 5, a third flow channel opening of the four-way reversing valve 5 is connected to a top opening of the second sorbent-coating heat exchanger 2, a fourth flow channel opening is connected to a top opening of the first sorbent-coating heat exchanger 4, a bottom opening of the second sorbent-coating heat exchanger 2 is communicated with a bottom opening of the first sorbent-coating heat exchanger 4 via the expansion valve 3 to form a closed loop, and a refrigerant flows in the closed loop to form the heat pump driven refrigerant closed loop. The flow direction of the refrigerant can be switched by means of the four-way reversing valve 5, so as to switch the heat release and cold release states of the second sorbent-coating heat exchanger 2 and the first sorbent-coating heat exchanger 4.

The first sorbent-coating heat exchanger 4 includes a plurality of layers of first fins 4-1 and a plurality of layers of first sorbent coatings 4-2, and each layer of first fins 4-1 is loaded with a first sorbent coating 4-2. The second sorbent-coating heat exchanger 2 includes a plurality of layers of second fins 2-1 and a plurality of layers of second sorbent coatings 2-2, and each layer of second fins 2-1 is loaded with a second sorbent coating 2-2. The first fins 4-1 and the second fins 4-2 are all installed in multiple layers and at equal intervals, and flow pipelines are installed between the second sorbent-coating heat exchanger 2 and the first sorbent-coating heat exchanger 4 in a round flow manner.

Through structural optimization mentioned above, the heat exchange effect in the second sorbent-coating heat exchanger 2 and the first sorbent-coating heat exchanger 4 is enhanced, which is beneficial to uniform and rapid heat transfer in the sorbent coatings.

Specifically, the fan driven air loop includes a first flow path 6 integrated outside the first sorbent-coating heat exchanger 4, a second flow path 7 integrated outside the second sorbent-coating heat exchanger 2, a first water collector 8, a second water collector 9 and a sorption water collection module 10. The first flow path 6 integrated outside the first sorbent-coating heat exchanger 4 includes a first three-way valve 6-1, a first air filter 6-2, a first inlet air duct 6-3, a first outlet air duct 6-4, a first fan 6-5 and a second three-way valve 6-6. The second flow path 7 integrated outside the second sorbent-coating heat exchanger 2 includes a third three-way valve 7-1, a second air filter 7-2, a second inlet air duct 7-3, a second outlet air duct 7-4, a second fan 7-5 and a fourth three-way valve 7-6. The sorption water collection module 10 includes an air heat exchanger 10-1, a third water collector 10-2, a fifth three-way valve 10-3 and a sixth three-way valve 10-4.

In the first flow path 6, the first three-way valve 6-1 is communicated with the first inlet air duct 6-3 via an air pipeline. An inlet air pipeline of the first inlet air duct 6-3 is provided with a first air filter 6-2. The first inlet air duct 6-3 and the first outlet air duct 6-4 are directly integrated outside the first sorbent-coating heat exchanger 4. The first outlet air duct 6-4 is communicated with an inlet of the first fan 6-5 via an air pipeline. An outlet of the first fan 6-5 is communicated with an inlet of the second three-way valve 6-6. Outlets of the second three-way valve 6-6 at two ends thereof are communicated with the first water collector 8 and an inlet, at one side of the bottom, of the air heat exchanger 10-1 in the sorption water collection module 10, respectively.

In the second flow path 7, the third three-way valve 7-1 is communicated with the second inlet air duct 7-3 via an air pipeline. An inlet air pipeline of the second inlet air duct 7-3 is provided with a second air filter 7-2. The second inlet air duct 7-3 and the second outlet air duct 7-4 are directly integrated outside the second sorbent-coating heat exchanger 2. The second outlet air duct 7-4 is communicated with an inlet of the second fan 7-5 via an air pipeline. An outlet of the second fan 7-5 is communicated with an inlet of the fourth three-way valve 7-6. Outlets of the fourth three-way valve 7-6 at two end thereof are communicated with the second water collector 9 and an inlet, at the other side of the bottom, of the air heat exchanger 10-1 in the sorption water collection module 10, respectively.

The third water collector 10-2 in the sorption water collection module 10 is directly integrated on the bottom of the air heat exchanger 10-1. Water obtained in the sorption-based atmospheric water harvesting working mode is collected in the third water collector 10-2 under the gravity of the water. An outlet of the air heat exchanger 10-1 at one side of the top thereof is connected to the fifth three-way valve 10-3, and an outlet of the air heat exchanger 10-1 at the other side of the top thereof is connected to the sixth three-way valve 10-4. Outlets of the fifth three-way valve 10-3 at two ends thereof are connected to the first three-way valve 6-1 and external environment, respectively. Outlets of the sixth three-way valve 10-4 at two ends thereof are connected to the third three-way valve 7-1 and external environment, respectively. By adjusting the path conditions of the three-way valves, the switching of "direct-dew-based atmospheric water harvesting working mode" and "sorption-based atmospheric water harvesting working mode" is realized.

Specifically, the sorption water collection module 10 has the functions of heat exchange and water collection. For the sorption-based atmospheric water harvesting working mode, heat exchange is carried out inside the air heat exchanger 10-1 on high-temperature and high-humidity air flown out of the second flow path 7 (or the first flow path 6) and low-temperature and low-humidity air flown out of the first flow path 6 (or the second flow path 7). Water vapor in the high-temperature and high-humidity air is condensed into water droplets, and the water droplets fall into the third water collector 10-2 under the gravity thereof. The heat exchanged low-temperature and low-humidity air flows into external environment through the fifth three-way valve 10-3 (or the sixth three-way valve 10-4), the heat exchanged high-temperature and high-humidity air flows back to the second flow path 7 (or the first flow path 6) through the sixth three-way valve 10-4 (or the fifth three-way valve 10-3), and water vapor desorbed and uncondensed is recycled.

Specifically, a water purification module is installed on a pipeline between the second three-way valve 6-6 and the first water collector 8, a water purification module is installed on a pipeline between the fourth three-way valve 7-6 and the second water collector 9 and a water purification module is installed between the air heat exchanger i 0-1 and the third water collector I 0-2. By means of water purification modules, water can be effectively prevented from being polluted by impurities such as dust to realize direct supply for safe water.

Specifically, the first three-way valve 6-1, the second three-way valve 6-6, the third three-way valve 7-1, the fourth three-way valve 7-6, the fifth three-way valve 10-3 and the sixth three-way valve 10-4 are all electromagnetic valves. The four-way reversing valve 5 is an electromagnetic reversing valve. The first three-way valve 6-1, the second three-way valve 6-6, the third three-way valve 7-1, the fourth three-way valve 7-6, the fifth three-way valve 10-3, the sixth three-way valve 10-4, the four-way reversing valve 5, the first fan 6-5, the second fan 7-5 and the compressor 1 are all intelligently controlled by a PLC module integrated with energy efficiency algorithms.

Specifically, the PLC module integrated with energy efficiency algorithms judges the energy efficiency of different water harvesting working modes based on the temperature and humidity of the working environment, and intelligently and self-adaptively controls the device for water harvesting from air. When the temperature and humidity of the working environment are in the high energy-efficiency range of the "direct-dew-based atmospheric water harvesting working mode", the path conditions of the three-way valves are adjusted to adopt the "direct-dew-based atmospheric water harvesting working mode" to obtain safe drinking water. When the temperature and humidity of the working environment are in the high energy-efficiency range of the "sorption-based atmospheric water harvesting working mode" or belongs to the range where only "sorption-based atmospheric water harvesting working mode" can operate, the path conditions of the three-way valves are adjusted to adopt the "sorption-based atmospheric water harvesting working mode" to obtain safe drinking water. When the device adopts the "sorption-based atmospheric water harvesting working mode" to obtain safe drinking water, the four-way reversing valve is controlled according to the sorption-desorption states of the first sorbent coatings and the second sorbent coatings, so that the sorbent coatings at the cooling side are always kept in a sorption state, and the sorbent coatings at the heat release side are always kept in a desorption state, so that continuous water supply is realized.

The self-adaptive multi-mode device for all-weather water harvesting from air has two working modes of "direct-dew-based atmospheric water harvesting working mode" and "sorption-based atmospheric water harvesting working mode", and the working processes of the different working modes are described as follows.

Specifically, the "direct-dew-based atmospheric water harvesting working mode" has two working paths.

Figure 2:
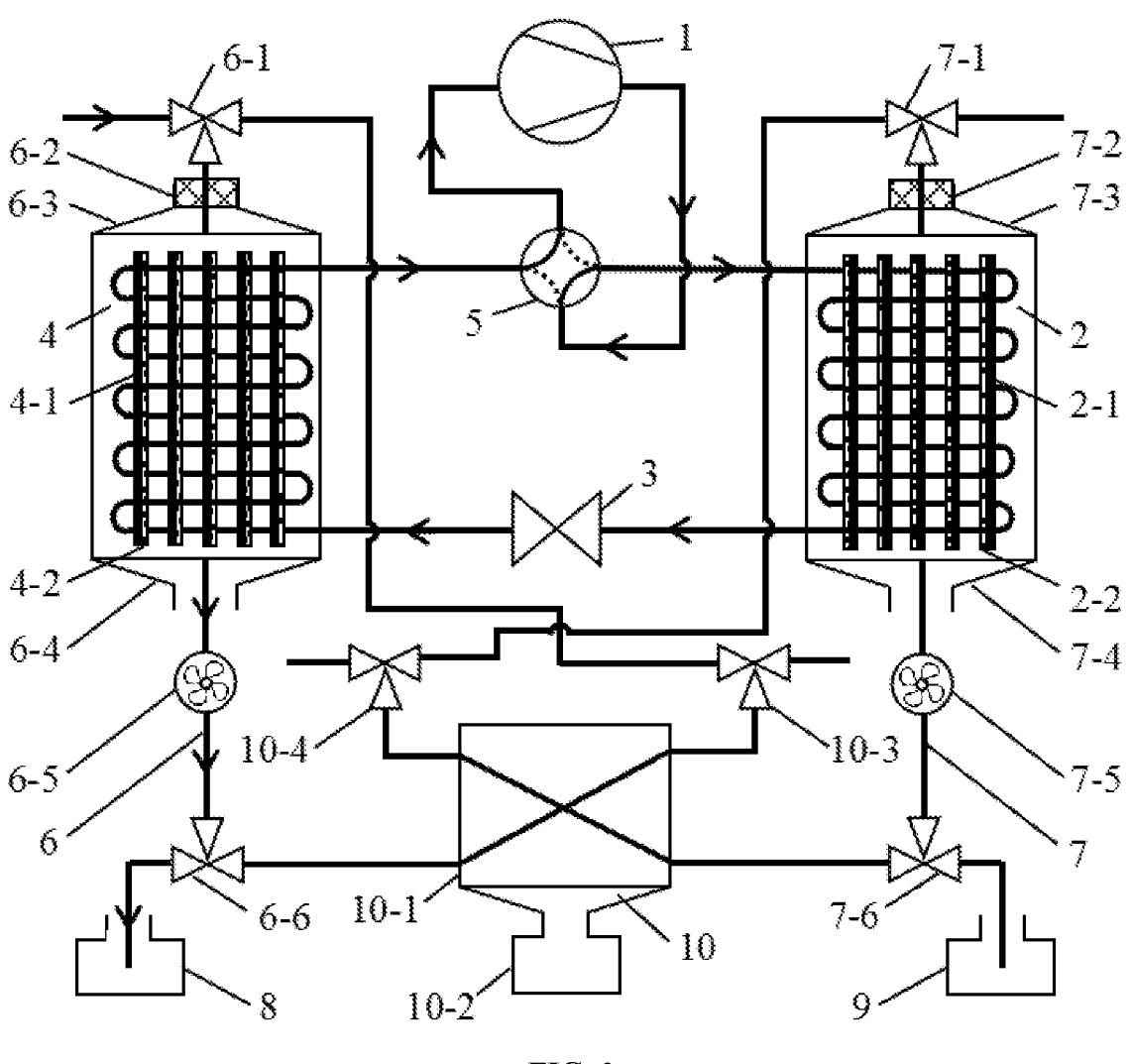
FIG. 2 is a working principle diagram of the first scheme in the "direct-dew-based atmospheric water harvesting working mode" of the self-adaptive multi-mode device for all-weather water harvesting from air in the present disclosure.

As shown in FIG. 2, in the four-way reversing valve 5, the first flow channel opening is communicated with the fourth flow channel opening, and the second flow channel opening is communicated with the third flow channel opening. The first sorbent-coating heat exchanger 4 serves as an evaporator of the heat pump system, and the second sorbent-coating heat exchanger 2 serves as a condenser of the heat pump system. The first three-way valve 6-1 is communicated with external air and the first inlet air duct 6-3. The inlet air pipeline of the first inlet air duct 6-3 is provided with a first air filter 6-2. The second three-way valve 6-6 is communicated with the first fan 6-5 and the first water collector 8. The second fan 7-5 is turned off In the operation path, during the operation of the heat pump driven refrigerant loop, cold energy is released outwards when the refrigerant flows through the first sorbent-coating heat exchanger 4, at the same time, external air flows along the first flow path 6 under the driving of the first fan 6-5, and is condensed when flowing through the first sorbent-coating heat exchanger 4, so that the temperature of air is decreased to below a dew point temperature to directly produce condensed water, and the produced condensed water is collected by the first water collector 8. The first air filter 6-2 can effectively filter dust and impurities in air so as to avoid the first sorbent coatings 4-2 from being blocked.

Figure 3:
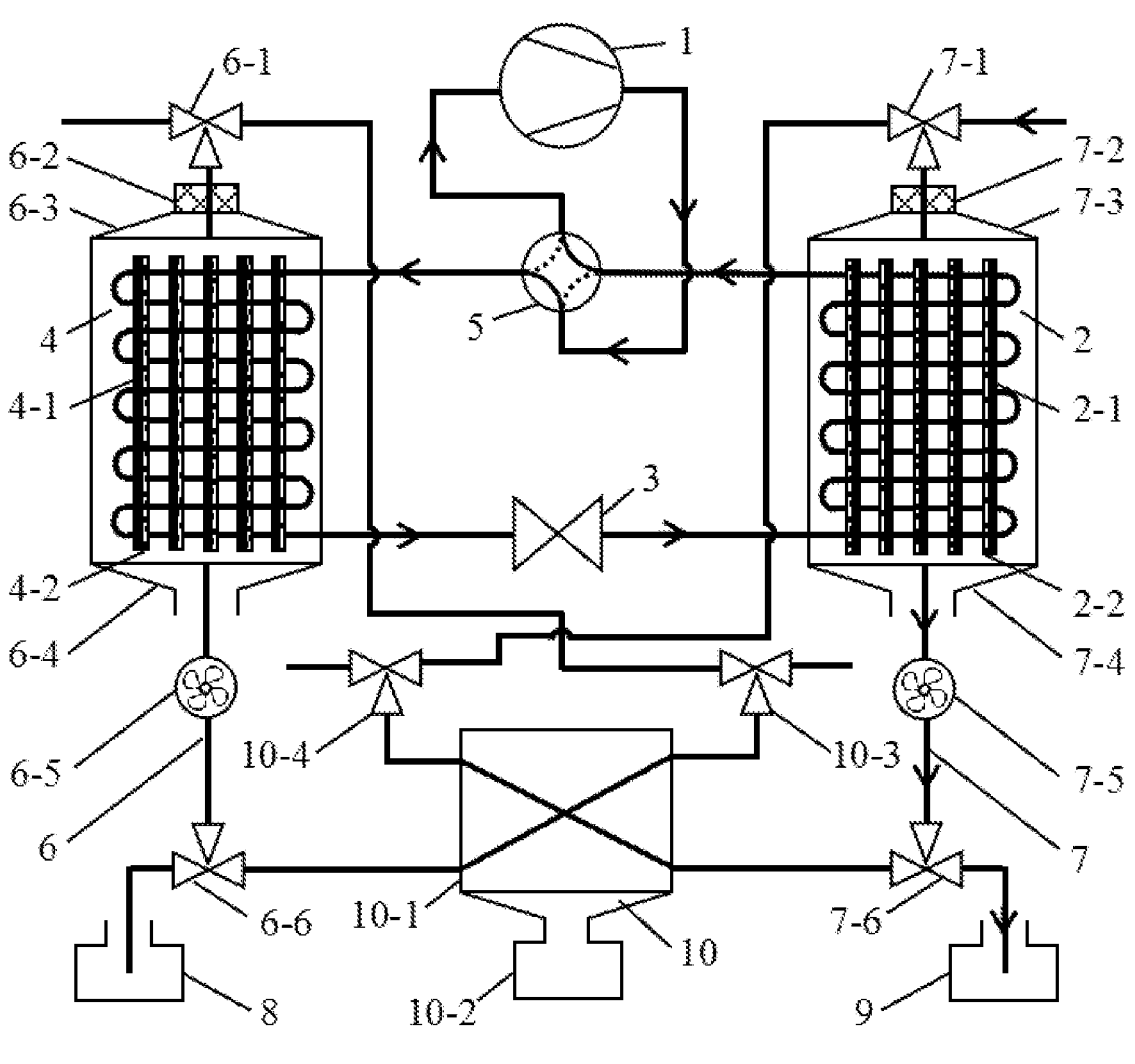
FIG. 3 is a working principle diagram of the second scheme in the "direct-dew-based atmospheric water harvesting working mode" of the self-adaptive multi-mode device for all-weather water harvesting from air in the present disclosure.

As shown in FIG. 3, in the four-way reversing valve 5, the first flow channel opening is communicated with the third flow channel opening, and the second flow channel opening is communicated with the fourth flow channel opening. The second sorbent-coating heat exchanger 2 serves as an evaporator of the heat pump system, and the first sorbent-coating heat exchanger 4 serves as a condenser of the heat pump system. The third three-way valve 7-1 is communicated with external air and the second inlet air duct 7-3. The inlet air pipeline of the second inlet air duct 7-3 is provided with a second air filter 7-2. The fourth three-way valve 7-6 is communicated with the second fan 7-5 and the second water collector 9. The first fan 6-5 is turned off In the operation path, during the operation of the heat pump driven refrigerant loop, cold energy is released outwards when the refrigerant flows through the second sorbent-coating heat exchanger 2, at the same time, external air flows along the second flow path 7 under the driving of the second fan 7-5, and is condensed when flowing through the second sorbent-coating heat exchanger 2, so that the temperature of air is decreased to below a dew point to directly produce condensed water, and the produced condensed water is collected by the second water collector 9. The second air filter 7-2 can effectively filter dust and impurities in air so as to avoid the second sorbent coatings 2-2 from being blocked.

In addition, In the "direct-dew-based atmospheric water harvesting working mode", the water vapor in air can be directly condensed into liquid droplets on the surface of the first sorbent-coating heat exchanger 4 (or the second sorbent-coating heat exchanger 2), and the liquid droplets can also clean and scour the first sorbent coatings 4-2 (or the second sorbent coatings 2-2) when falling, so as to ensure that the sorbent can still maintain the original sorption and desorption capacity even in extremely harsh dust and other environments.

Specifically, the "sorption-based atmospheric water harvesting working mode" has two working stages.

Figure 4:
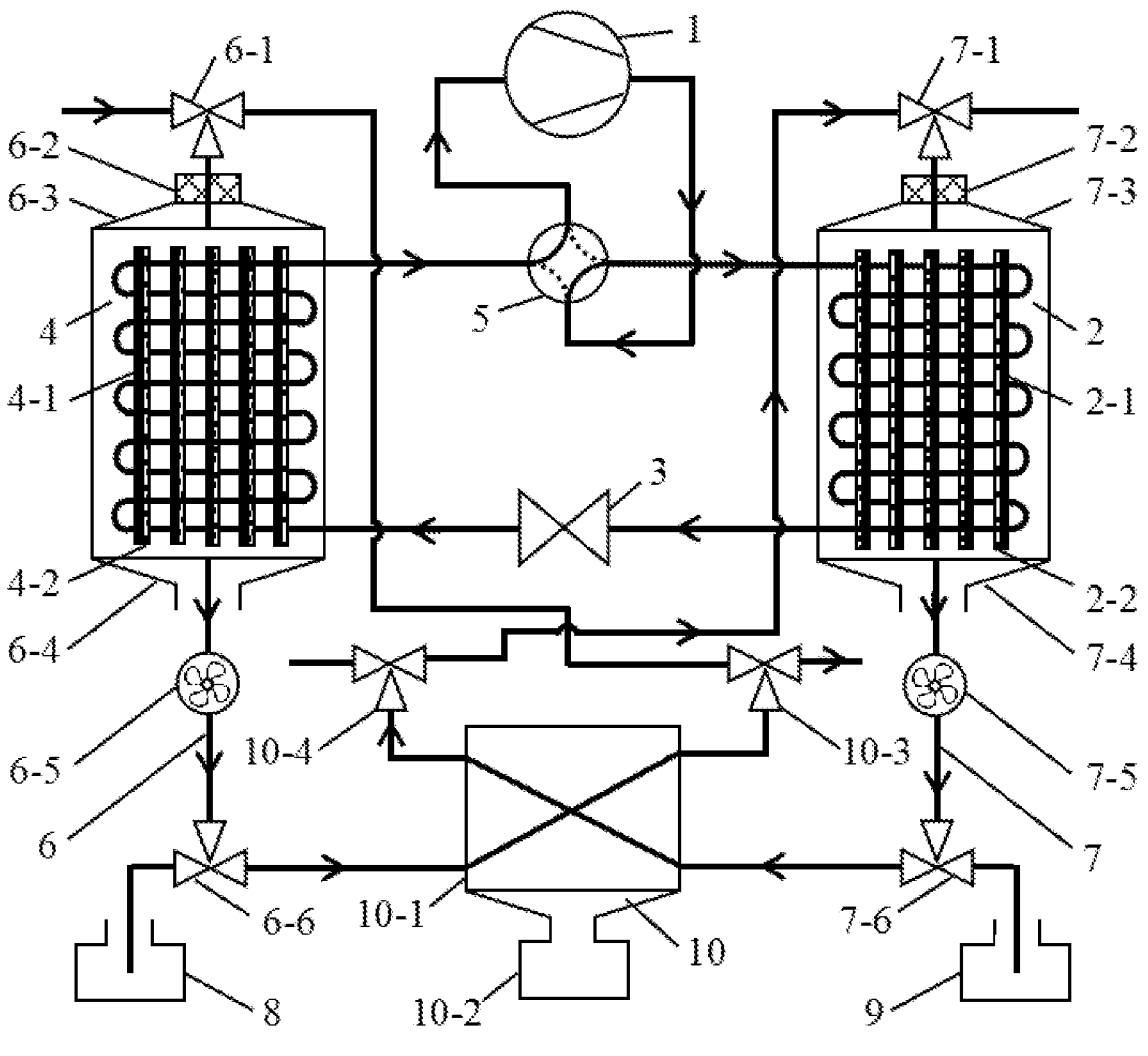
FIG. 4 is a working principle diagram of the first stage in "sorption-based atmospheric water harvesting working mode" of the self-adaptive multi-mode device for all-weather water harvesting from air in the present disclosure.

In the first working stage, as shown in FIG. 4, in the four-way reversing valve 5, the first flow channel opening is communicated with the fourth flow channel opening, and the second flow channel opening is communicated with the third flow channel opening. The first sorbent-coating heat exchanger 4 serves as an evaporator of the heat pump system, and the second sorbent-coating heat exchanger 2 serves as a condenser of the heat pump system. In the first flow path 6, the first three-way valve 6-1 is communicated with external air and the first inlet air duct 6-3. The inlet air pipeline of the first inlet air duct 6-3 is provided with a first air filter 6-2. The second three-way valve 6-6 is communicated with the first fan 6-5 and the air heat exchanger 10-1. In the second flow path 7, the third three-way valve 7-1 is communicated with the sixth three-way valve 10-4 and the second inlet air duct 7-3. An inlet air pipeline of the second inlet air duct 7-3 is provided with a second air filter 7-2. The fourth three-way valve 7-6 is communicated with the second fan 7-5 and the air heat exchanger 10-1. In the sorption water collection module 10, the fifth three-way valve 10-3 is communicated with the air heat exchanger 10-1 and external environment and the sixth three-way vale 10-4 is communicated with the air heat exchanger 10-1 and the third three-way valve 7-1.

In the first working stage, during the operation of the heat pump driven refrigerant loop, the low-temperature and low-pressure refrigerant flows into the first sorbent-coating heat exchanger 4 through the expansion valve 3 to release cold energy outwards. At that time, the relative humidity of the first sorbent coatings 4-2 loaded on the first fins 4-1 is increased since air flowing through the first sorbent coatings 4-2 is cooled. And sorption heat is taken away more easily, so that the water vapor in air can be sorbed more easily. The refrigerant flowing out of the first sorbent-coating heat exchanger 4 becomes in a relatively high temperature and high pressure state after passing through the compressor I, and then flows into the second sorbent-coating heat exchanger 2 via a refrigerant pipeline and releases heat outwards. At that time, the heat is adsorbed by the second sorbent coatings 2-2 loaded on the second fins 2-1, and the sorbent is driven to desorb to release the water vapor.

At the same time, external air flowing along the first flow path 6 is cooled when flowing through the first sorbent-coating heat exchanger 4 under the driving of the first fan 6-5. The water vapor is sorbed by the first sorbent coatings 4-2, and finally the low-temperature and low-humidity air flows into the air heat exchanger 10-1. The first air filter 6-2 can effectively filter dust and impurities in air to avoid the first sorbent coatings 4-2 from being blocked. The air flowing along the second flow path 7 is heated when flowing through the second sorbent-coating heat exchanger 2 under the driving of the second fan 7-5 and take away the water vapor released by the desorbed sorbent. Finally, the high-temperature and high-humidity air flows into the air heat exchanger 10-1. The second air filter 7-2 can effectively filter dust and impurities in air so as to avoid the second sorbent coatings 2-2 from being blocked.

In the sorption water collection module, heat exchange is carried out inside the air heat exchanger 10-1 on high-temperature and high-humidity air flown out of the second flow path 7 and low-temperature and low-humidity air flown out of the first flow path 6. Water vapor in the high-temperature and high-humidity air is condensed into water droplets, and the water droplets fall into the third water collector 10-2 under the gravity thereof. The heat exchanged low-temperature and low-humidity air flows into external environment through the fifth three-way valve 10-3, the heat exchanged high-temperature and high-humidity air flows back to the second flow path 7 through the sixth three-way valve 10-4, so that desorbed and uncondensed water vapor can be recycled.

Figure 5:
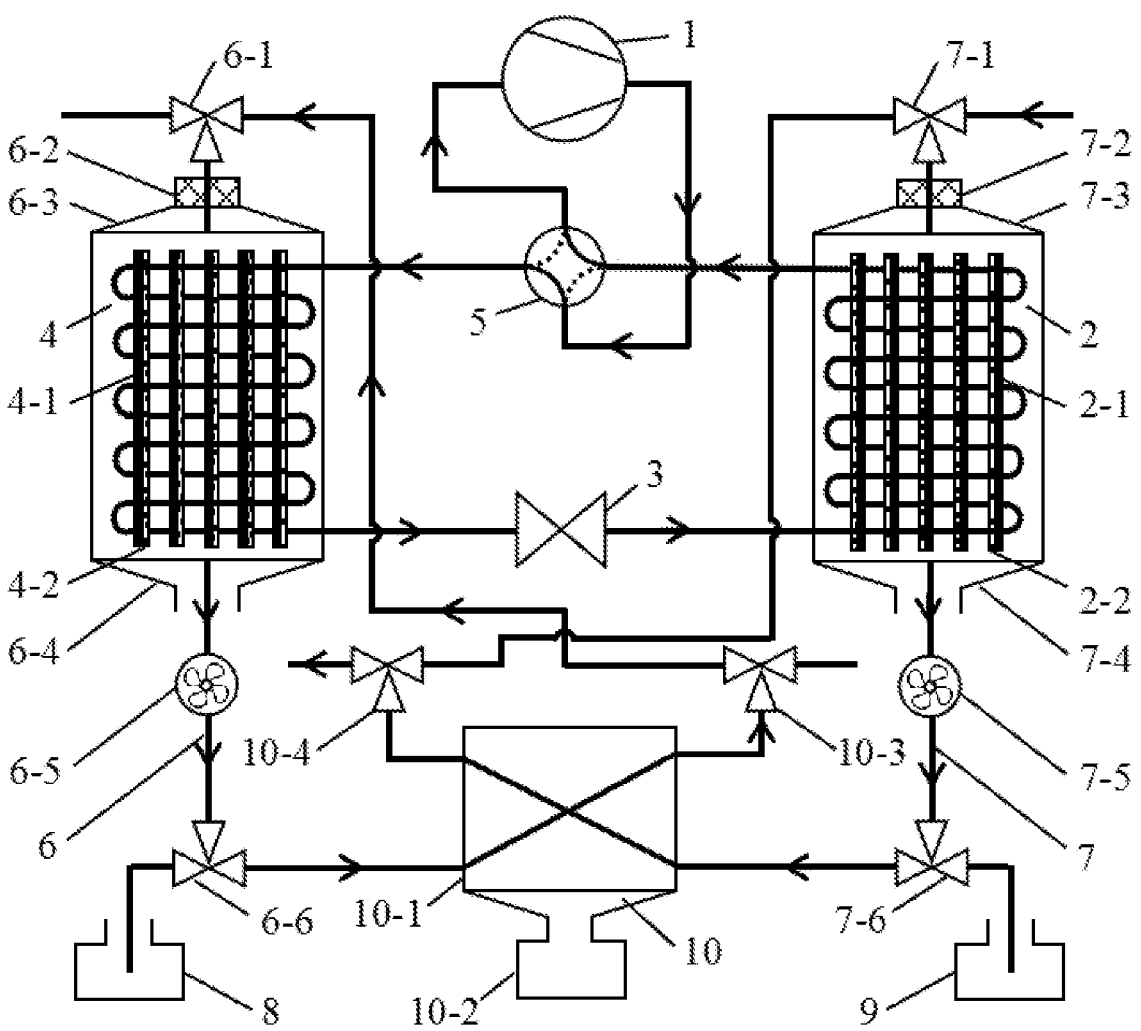
FIG. 5 is a working principle diagram of the second stage in "sorption-based atmospheric water harvesting working mode" of the self-adaptive multi-mode device for all-weather water harvesting from air in the present disclosure.

In the second working stage, as shown in FIG. 5, in the four-way reversing valve 5, the first flow channel opening is communicated with the third flow channel opening, and the second flow channel opening is communicated with the fourth flow channel opening. The second sorbent-coating heat exchanger 2 serves as an evaporator of the heat pump system, and the first sorbent-coating heat exchanger 4 serves as a condenser of the heat pump system. In the first flow path 6, the first three-way valve 6-1 is communicated with the fifth three-way valve 10-3 and the first inlet air duct 6-3. The inlet air pipeline of the first inlet air duct 6-3 is provided with a first air filter 6-2. The second three-way valve 6-6 is communicated with the first fan 6-5 and the air heat exchanger 10-1. In the second flow path 7, the third three-way valve 7-1 is communicated with external air and the second inlet air duct 7-3. An inlet air pipeline of the second inlet air duct 7-3 is provided with a second air filter 7-2. The fourth three-way valve 7-6 is communicated with the second fan 7-5 and the air heat exchanger 10-1. In the sorption water collection module 10, the fifth three-way valve 10-3 is communicated with the air heat exchanger 10-1 and the first three-way valve 6-1 and the sixth three-way vale 10-4 is communicated with the air heat exchanger 10-1 and external environment.

In the second working stage, during the operation of the heat pump driven refrigerant loop, the low-temperature and low-pressure refrigerant flows into the second sorbent-coating heat exchanger 2 through the expansion valve 3 to release cold energy outwards. At that time, the relative humidity of the second sorbent coatings 2-2 loaded on the second fins 2-1 is increased since air flowing through the second sorbent coatings 2-2 is cooled. And sorption heat is taken away more easily, and the water vapor in air can be sorbed more easily. The refrigerant flowing out of the second sorbent-coating heat exchanger 2 becomes in a relatively high temperature and high pressure state after passing through the compressor 1, and then flows into the first sorbent-coating heat exchanger 4 via a refrigerant pipeline and releases heat outwards. At that time, the heat is adsorbed by the first sorbent coatings 4-2 loaded on the first fins 4-1, and the sorbent is driven to desorb to release the water vapor.

At the same time, external air flowing along the second flow path 7 is cooled when flowing through the second sorbent-coating heat exchanger 2 under the driving of the second fan 7-5. The water vapor is sorbed by the second sorbent coatings 2-2, and finally the low-temperature and low-humidity air flows into the air heat exchanger 10-1. The second air filter 7-2 can effectively filter dust and impurities in air to avoid the second sorbent coatings 2-2 from being blocked. The air flowing along the first flow path 6 is heated when flowing through the first sorbent-coating heat exchanger 2 under the driving of the first fan 6-5 and take away. the water vapor released by the desorbed sorbent. Finally, the high-temperature and high-humidity air flows into the air heat exchanger 10-1. The first air filter 6-2 can effectively filter dust and impurities in air so as to avoid the first sorbent coatings 4-2 from being blocked.

In the sorption water collection module, heat exchange is carried out inside the air heat exchanger I 0-1 on high-temperature and high-humidity air flown out of the first flow path 6 and low-temperature and low-humidity air flown out of the first flow path 7. Water vapor in the high-temperature and high-humidity air is condensed into water droplets, and the water droplets fall into the third water collector 10-2 under the gravity thereof. The heat exchanged low-tempera-ture and low-humidity air flows into external environment through the sixth three-way valve 10-4, the heat exchanged high-temperature and high-humidity air flows back to the first flow path 6 through the fifth three-way valve 10-4, so that desorbed and uncondensed water vapor can be recycled.

The first three-way valve 6-1, the second three-way valve 6-6, the third three-way valve 7-1, the fourth three-way valve 7-6, the fifth three-way valve 10-3, the sixth three-way valve 10-4, the four-way reversing valve 5, the first fan 6-5, the second fan 7-5 and the compressor 1 are all intelligently controlled by the PLC module integrated with energy effi-ciency algorithms according to the working environment, so that self-switching of the working modes and the working stages are realized.

The embodiments described above only describe the preferred manner of the present disclosure and do not limit the scope of the present disclosure, and various modifica-tions and improvements made to the technical solution of the present disclosure by those skilled in the art will fall within the scope of protection as determined by the claims of the present disclosure without departing from the spirit of the design of the present disclosure.

What is claimed is:

1. A self-adaptive multi-mode device for all-weather water harvesting from air, comprising: two sorbent-coating heat exchangers, a plurality of fins respectively arranged inside the two sorbent-coating heat exchangers, a refrigerant closed-loop pipeline for communicating the plurality of fins inside the two sorbent-coating heat exchangers in series, a first three-way valve and a third three-way valve respec-tively arranged at a first inlet air duct and a second inlet air duct of the two sorbent-coating heat exchangers, fans for providing power to drive air inside the two sorbent-coating heat exchangers, a second three-way valve and a fourth three-way valve respectively arranged at a first outlet air duct and a second outlet air duct of the two sorbent-coating heat exchangers, water collectors configured for receiving water, and a sorption water collection module communi-cated with the two sorbent-coating heat exchangers via pipelines;

wherein the water collectors comprise a first water col-lector and a second water collector;

wherein the plurality of fins comprise a plurality of first fins and a plurality of second fins;

wherein the fans comprise a first fan and a second fan, wherein sorbent coatings are respectively arranged on the plurality of fins;

a four-way reversing valve, a compressor and an expan-sion valve are arranged on the refrigerant closed-loop pipeline, and are integrated with the two sorbent-coating heat exchangers to form a heat pump cycle and drive refrigerant to flow inside the refrigerant closed-loop pipeline; and the sorption water collection module comprises an air heat exchanger, and a first inlet and a second inlet of the air heat exchanger are communicated with the second and fourth three-way valves respectively arranged at the first and second outlet air ducts of the two sorbent-coating heat exchangers, a fifth three-way valve and a sixth three-way valve respectively communicated with a first outlet and a second outlet of the air heat exchanger, and a third water collector configured for collecting water produced by the two sorbent-coating heat exchangers.

2. The self-adaptive multi-mode device for high efficiency and all-weather water harvesting from air according to claim 1, wherein the two sorbent-coating heat exchangers com-prise a first sorbent-coating heat exchanger and a second sorbent-coating heat exchanger, wherein the plurality of first fins are arranged inside the first sorbent-coating heat exchanger, the first inlet air duct and the first outlet air duct are directly integrated outside the first sorbent-coating heat exchanger, and the first fan is arranged at a bottom of the first sorbent-coating heat exchanger or inside the first sorbent-coating heat exchanger; the first three-way valve is installed on a pipeline of the first inlet air duct, and the second three-way valve is arranged on a pipeline of the first outlet air duct; and the plurality of second fins are arranged inside the second sorbent-coating heat exchanger, the second inlet air duct and the second outlet air duct are directly inte-grated outside the second sorbent-coating heat exchanger, and the second fan is arranged at a bottom of the second sorbent-coating heat exchanger or inside the second sorbent-coating heat exchanger; the third three-way valve is installed on a pipeline of the second inlet air duct, and the fourth three-way valve is arranged on a pipeline of the second outlet air duct.

3. The self-adaptive multi-mode device for all-weather water harvesting from air according to claim 2, wherein a first air filter is installed between the first inlet air duct and the first three-way valve; and a second air filter is installed between the second inlet air duct and the third three-way valve.

4. The self-adaptive multi-mode device for all-weather water harvesting from air according to claim 2, wherein one end of the second three-way valve connected to the first outlet air duct is connected to the first water collector, and another end of the second three-way valve connected to the first outlet air duct is connected to the air heat exchanger; one end of the first three-way valve connected to the first inlet air duct is communicated with environmental air, and another end of the first three-way valve connected to the first inlet air duct is connected to one end of a fifth three-way valve via a pipeline; and another end of the fifth three-way valve is communicated with external environment;

one end of the fourth three-way valve connected to the second outlet air duct is connected to the second water collector, and another end of the fourth three-way valve connected to the second outlet air duct is connected to the air heat exchanger; one end of the third three-way valve connected to the second inlet air duct is commu-nicated with environmental air, and another end of the third three-way valve connected to the second inlet air duct is connected to one end of the sixth three-way valve via a pipeline; and another end of the sixth three-way valve is communicated with external envi-ronment.

5. The self-adaptive multi-mode device for all-weather water harvesting from air according to claim 2, wherein the first three-way valve, the second three-way valve, the third three-way valve, the fourth three-way valve, the fifth three-way valve and the sixth three-way valve are all electromag-netic valves; the four-way reversing valve is an electromag-netic reversing valve; the first three-way valve, the second three-way valve, the third three-way valve, the fourth three-way valve, the fifth three-way valve, the sixth three-way valve, the four-way reversing valve, the first fan, the second fan and the compressor are all controlled by a PLC module, wherein the PLC module is integrated with energy efficiency algorithms to adaptively switch direct-dew-based atmospheric water harvesting working mode and sorption-based atmospheric water harvesting working mode according to temperature and humidity of working environment to realize continuous energy-saving water production.

6. The self-adaptive multi-mode device for all-weather water harvesting from air according to claim 5, wherein a first air filter is installed between the first inlet air duct and the first three-way valve; and a second air filter is installed between the second inlet air duct and the third three-way valve.

* * * * *